United States Patent
Lee

(10) Patent No.: US 12,440,050 B2
(45) Date of Patent: Oct. 14, 2025

(54) INFLATABLE MAT STRUCTURE

(71) Applicant: CATHAY CONSOLIDATED INC., Yilan County (TW)

(72) Inventor: Hao-Chen Lee, Yilan County (TW)

(73) Assignee: CATHAY CONSOLIDATED INC., Yilan County (TW)

( * ) Notice: Subject to any disclaimer, the term of this patent is extended or adjusted under 35 U.S.C. 154(b) by 398 days.

(21) Appl. No.: 18/094,972

(22) Filed: Jan. 9, 2023

(65) Prior Publication Data

US 2024/0225322 A1 Jul. 11, 2024

(51) Int. Cl.
| | |
|---|---|
| A47C 27/08 | (2006.01) |
| A47G 9/06 | (2006.01) |
| B32B 3/08 | (2006.01) |
| B32B 7/05 | (2019.01) |
| B32B 27/36 | (2006.01) |
| A47G 9/00 | (2006.01) |

(52) U.S. Cl.
CPC .............. *A47G 9/062* (2013.01); *B32B 3/08* (2013.01); *B32B 7/05* (2019.01); *B32B 27/36* (2013.01); *A47G 2009/003* (2013.01)

(58) Field of Classification Search
CPC ..... A47C 27/087; A47C 27/81; A47C 27/127; A47C 27/16; B29C 66/438; A47G 2009/003

USPC .............................................. 5/712, 711, 706
See application file for complete search history.

(56) References Cited

U.S. PATENT DOCUMENTS

| | | | |
|---|---|---|---|
| 7,591,036 B2* | 9/2009 | Lin ...................... | A47C 27/081 5/713 |
| 2012/0000017 A1* | 1/2012 | Xia ...................... | A47C 27/087 5/706 |
| 2022/0274351 A1* | 9/2022 | Huang .................. | B29C 66/438 |

* cited by examiner

*Primary Examiner* — David R Hare
*Assistant Examiner* — Joseane E. Tejada
(74) *Attorney, Agent, or Firm* — HDLS IPR SERVICES; Chun-Ming Shih

(57) ABSTRACT

An inflatable mat structure includes a mat. The mat includes an upper covering layer, a lower covering layer, and a plurality of blocking layers horizontally disposed between the upper and lower covering layers. The blocking layers pass through a plurality of longitudinal connecting members to be positioned at different positions. The blocking layers are partially wavy through the structural characteristics of the longitudinal connecting members, and the interior of the mat has a plurality of layered spaces formed by the blocking layers, so that the mat can reduce the possibility of air convection, so as to block air convection and prevent temperature radiation.

10 Claims, 4 Drawing Sheets

INFLATABLE MAT STRUCTURE

FIELD OF THE INVENTION

The present invention relates to an inflatable mat structure, and more particularly to a mat that is easy to manufacture, thin and portable, and capable of blocking air convection and temperature radiation.

BACKGROUND OF THE INVENTION

Many brave people have an adventurous spirit. They like to be close to nature and are interested in conquering inaccessible polar regions, such as climbing Mount Everest which has extremely harsh weather conditions. The average temperature of Mount Everest is minus 29 degrees Celsius. It is called the third pole of the world, which means its temperature is second to the North Pole and the South Pole.

In recent years, more and more people love outdoor leisure activities, including camping and climbing. In addition to preparing enough food and drinking water, it is very important for keeping warm. If there are no enough equipages to keep out the cold, a person may suffer from hypothermia, which will cause trembling, unconsciousness, or mental disorder. However, if a person suffers from severe hypothermia, it will cause shock, cardiac arrest, and deadly danger. Regardless of general mountain activities or camping in polar regions, people may suffer from hypothermia when sleeping at night because the temperature is lower at night. If a person lies directly on the ground, the low-temperature conduction of the ground will increase the chance of suffering from hypothermia. Thus, people often put a layer of aluminum foil pad under the sleeping mat to reduce the low-temperature conduction of the ground. However, the effect of keeping out the cold for this single-layer aluminum foil pad is not good. If it is used in polar environment, the effect of keeping out the cold is poor. Furthermore, outdoor activities, such as camping, need a lot of equipages. It is required for all equipages to be lightweight. Equipages need to meet the requirements of being light, easy storage and the like, which indirectly affect functional improvements. In addition, for manufacturers, the functional improvement may lead to the manufacturing difficulty or increase the cost. The products cannot be commercialized.

As to sleeping mats on the market, the effect of keeping out the cold is not good. If this sleeping mat is used in the polar environment, it cannot meet the requirements. Accordingly, the inventor of the present invention has devoted himself based on his many years of practical experiences to solve these problems.

SUMMARY OF THE INVENTION

The primary object of the present invention is to provide an inflatable mat structure, which is made of light and thin connected sheets. The mat is light in weight and can be stored easily.

Another object of the present invention is to provide an inflatable mat structure, which has a plurality of layered spaces therein. Thus, the mat can block air convection and temperature radiation effectively and greatly. When the mat is used in an extremely low temperature environment, it can effectively resist the low temperature of the ground and prevent the user from suffering hypothermia at night.

A further object of the present invention is to provide an inflatable mat structure, which has a plurality of longitudinal connecting members. The longitudinal connecting member has different widths according to height and low positions. The blocking layers fitted on the longitudinal connecting member have openings that are different in size and have different widths. Thus, when the blocking layers are fitted on the longitudinal connecting member, they are held and positioned by the corresponding widths of the longitudinal connecting member according to high and lower positions, so that a plurality of layered spaces is formed inside the mat. Because the layered spaces are not in communication with each other, the mat is able to block air convection and temperature radiation.

A further object of the present invention is to provide an inflatable mat structure, which utilizes the structural characteristics of the longitudinal connecting members for the blocking layers to be partially wavy. In this way, the interior of the mat has multiple layered spaces formed by the blocking layers, and the blocking layers are partially wavy through the longitudinal connection members. The mat can reduce the possibility of air convection, so as to block air convection and prevent temperature radiation.

A further object of the present invention is to provide an inflatable mat structure, which has blocking layers fitted on the longitudinal connecting member. The blocking layers have openings that are different in size and correspond to the different widths of the longitudinal connecting member. Therefore, the blocking layers are easily fitted on the longitudinal connecting member during production, without complicated procedures. The processing is time-saving, which can improve the efficiency and reduce the production cost, thereby lowering the selling price and improving the competitiveness.

In order to achieve the foregoing objects, the mat is an inflatable structure, comprising an upper covering layer, a lower covering layer, and a space defined between the upper covering layer and the lower covering layer. The peripheries of the upper covering layer and the lower covering layer are joined and closed. A blocking unit is horizontally disposed between the upper covering layer and the lower covering layer. The blocking unit includes a plurality of blocking layers. The blocking layers pass through a plurality of longitudinal connecting members. The longitudinal connecting members are disposed between the upper covering layer and the lower covering layer.

In an embodiment, the longitudinal connecting member is in the form of a light and thin sheet. A plurality of upper joining portions is disposed on a top of the longitudinal connecting member. The upper joining portions are joined to an inner edge of the upper covering layer. A plurality of lower joining portions is disposed on a bottom of the longitudinal connecting member. The lower joining portions are joined to an inner edge of the lower covering layer. The longitudinal connecting member includes a plurality of first connecting bodies and second connecting bodies. The first connecting bodies each have different widths according to height and low positions. Preferably, the first connecting body has a trapezoid shape with a narrow upper portion and a wide lower portion. Alternatively, the first connecting body has a stepped side with a narrow top and a wide bottom, but not limited thereto. The second connecting bodies each have a same width from top to bottom. Alternatively, the second connecting bodies each have a narrow top and a wide bottom, but not limited thereto. The bottoms of the first connecting bodies and the second connecting bodies are connected. The first connecting bodies and the second connecting bodies are spaced and arranged alternately.

In an embodiment, the mat further comprises a blocking unit fitted on the longitudinal connecting members. The blocking unit includes one or more than two blocking layers. The blocking layers each have openings corresponding in position and in number to the longitudinal connecting members. The openings of the blocking layers are fitted on the longitudinal connecting members and correspond to the different widths of the longitudinal connecting members. The openings of the blocking layers are different in size, having different widths.

In an embodiment, the blocking layer of the blocking unit is made of a polyester film material with high reflectivity and low absorptivity.

In an embodiment, the mat is a seat mat or a sleeping mat, and the size of the mat can be changed as required.

In an embodiment, the inflatable mat is equipped with a nozzle, which can be inflated or deflated as required for portability.

DETAILED DESCRIPTION OF THE PREFERRED EMBODIMENTS

Embodiments of the present invention will now be described, by way of example only, with reference to the accompanying drawings.

Figure 1:
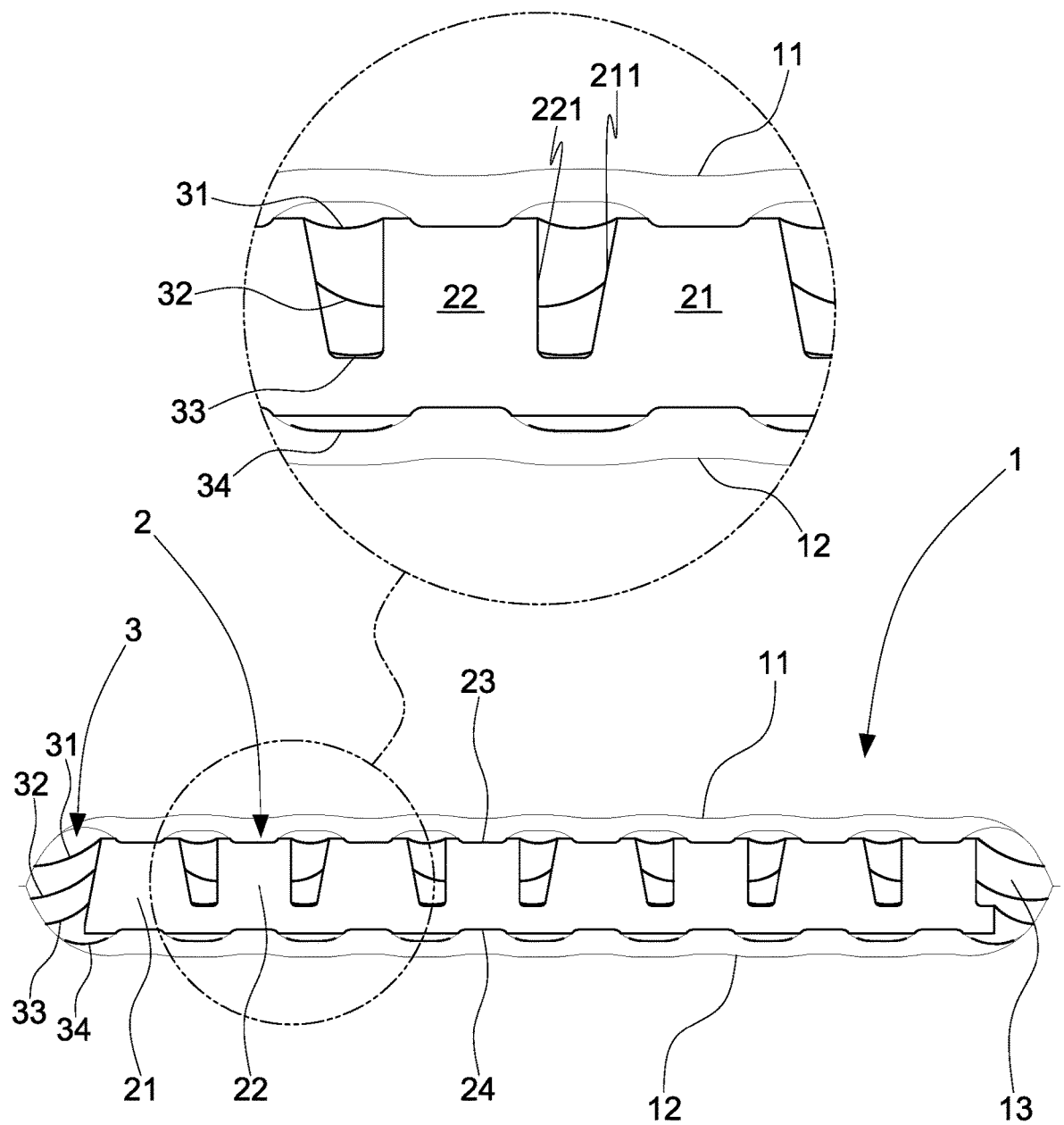
FIG. 1 is a partial cross-sectional view of the present invention.
Figure 2:
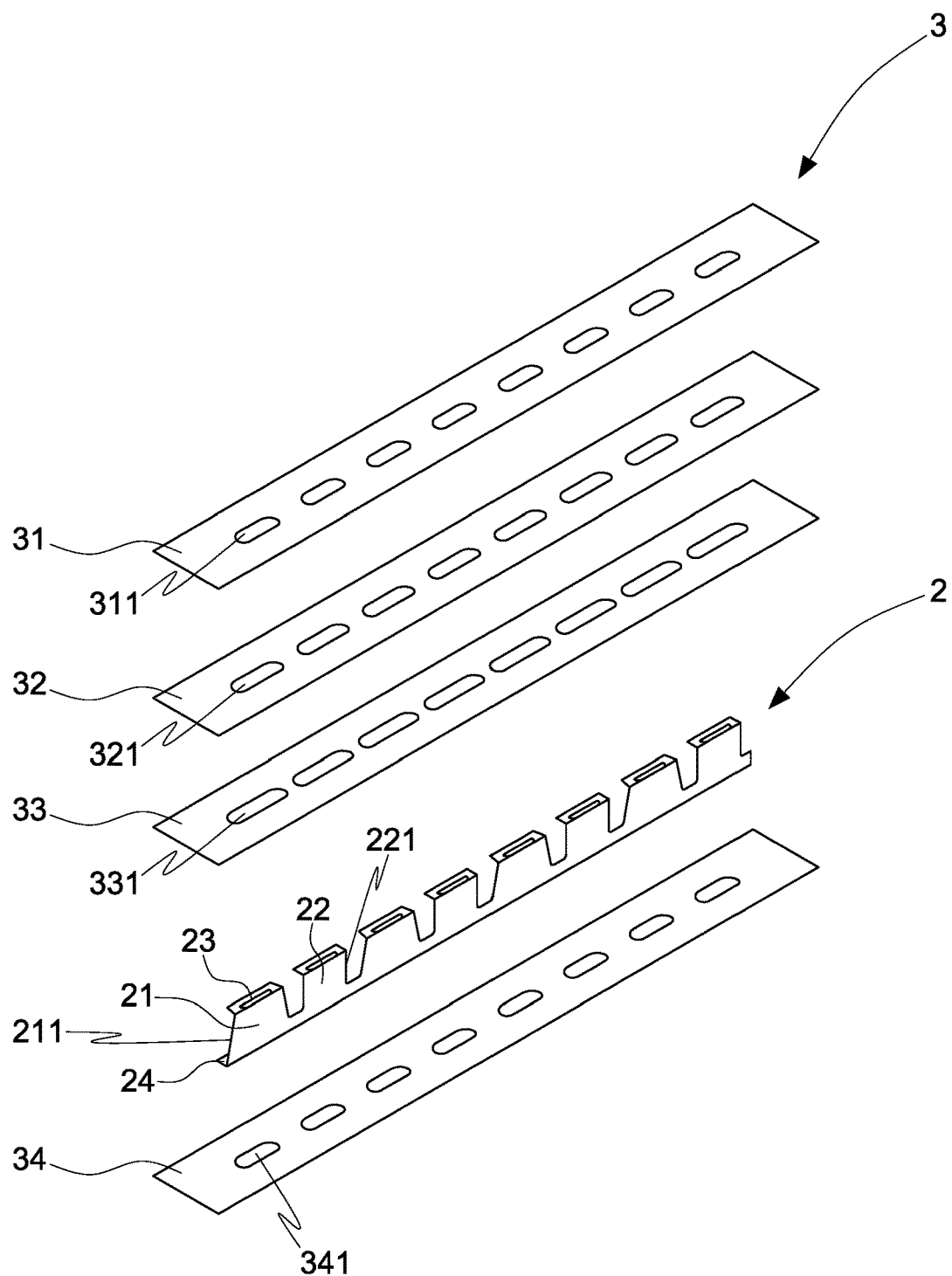
FIG. 2 is a perspective view of the longitudinal connecting member and the blocking unit of the present invention.
Figure 3:
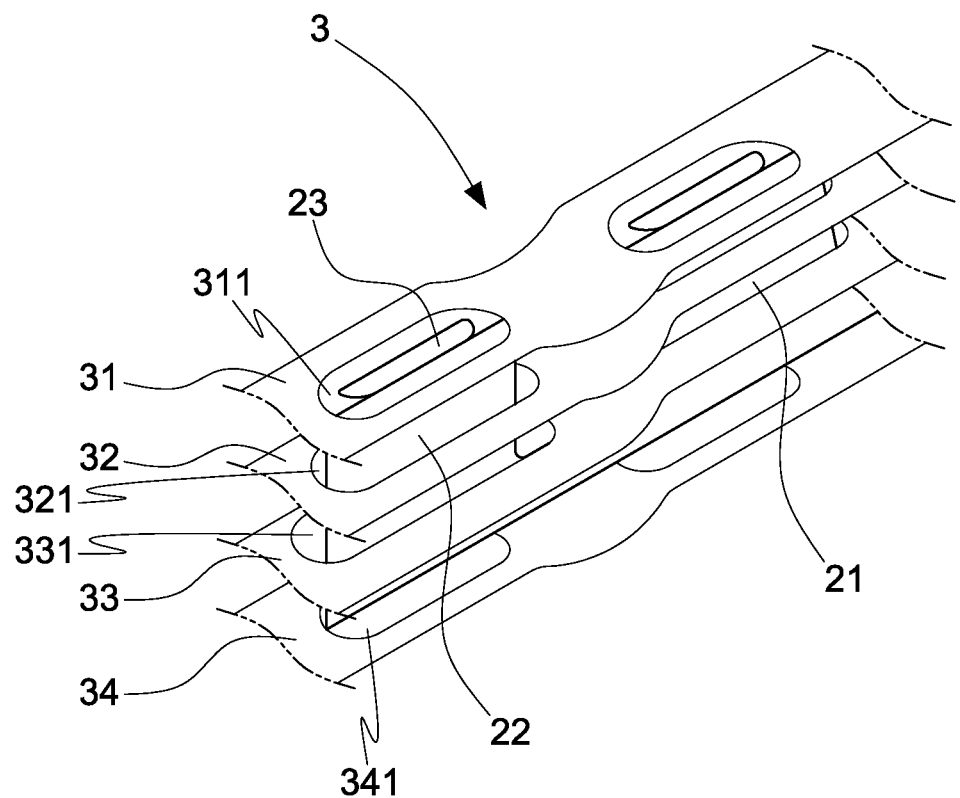
FIG. 3 is a partial schematic view of the present invention, illustrating that the blocking layers of the blocking unit are respectively fitted and positioned by the longitudinal connecting member.

Please refer to FIG. 1, FIG. 2 and FIG. 3. The present invention discloses an inflatable mat structure, comprising a mat 1. The mat 1 is an inflatable structure. The mat 1 comprises an upper covering layer 11, a lower covering layer 12, and a space 13 defined between the upper covering layer 11 and the lower covering layer 12. The peripheries of the upper covering layer 11 and the lower covering layer 12 are joined and closed.

The upper covering layer 11 and the lower covering layer 12 are longitudinally connected by a plurality of longitudinal connecting members 2. The longitudinal connecting member 2 is in the form of a light and thin sheet structure. A plurality of upper joining portions 23 is disposed on the top of the longitudinal connecting member 2. The upper joining portions 23 are joined to the inner edge of the upper covering layer 11. A plurality of lower joining portions 24 is disposed on the bottom of the longitudinal connecting member 2. The lower joining portions 24 are joined to the inner edge of the lower covering layer 22. The longitudinal connecting member 2 includes a plurality of first connecting bodies 21 and second connecting bodies 22 that are spaced and arranged alternately. The first connecting body 21 is designed to have different widths according to height and low positions. In this embodiment, the first connecting body 21 has a trapezoid shape with a narrow upper portion and a wide lower portion. The second connecting body 22 is designed to have the same width from top to bottom. The bottoms of the first connecting bodies 21 and the second connecting bodies 22 are connected.

The present invention further comprises a blocking unit 3 fitted on the connecting members 2. The horizontal blocking unit 3 is composed of one or more than two blocking layers. In this embodiment, the blocking unit 3 has four layers (the number of layers can be increased or decreased arbitrarily), including a first blocking layer 31, a second blocking layer 32, a third blocking layer 33, and a fourth blocking layer 34. A plurality of first openings 311 is defined in the first blocking layer 31. A plurality of second openings 321 is defined in the second blocking layer 32. A plurality of third openings 331 is defined in the third blocking layer 33. A plurality of fourth openings 341 is defined in the fourth blocking layer 34. The openings correspond in position to the first connecting bodies 21 and the second connecting bodies 22.

Because the first connecting body 21 of the longitudinal connecting member 2 is designed to have a narrow upper portion and a wide lower portion, the widths of the first opening 311 to the fourth opening 341 corresponding to the first connecting bodies 21 gradually increase. As shown in FIGS. 1-3, after the blocking layers, namely, the first blocking layer 31, the second blocking layer 32, the third blocking layer 33 and the fourth blocking layer 34, are fitted on the first connecting bodies 21, they are held and positioned by the corresponding widths of the first connecting bodies 21 according to high and lower positions, so that the first blocking layer 31, the second blocking layer 32, the third blocking layer 33 and the fourth blocking layer 34 are spaced apart from each other to form a plurality of layered spaces. Because the layered spaces are not in communication with each other, they can be used to block air convection and temperature radiation. Thus, when the mat 1 is used in a polar environment, it can effectively resist the low temperature of the ground and prevent the user from suffering hypothermia.

Figure 4:
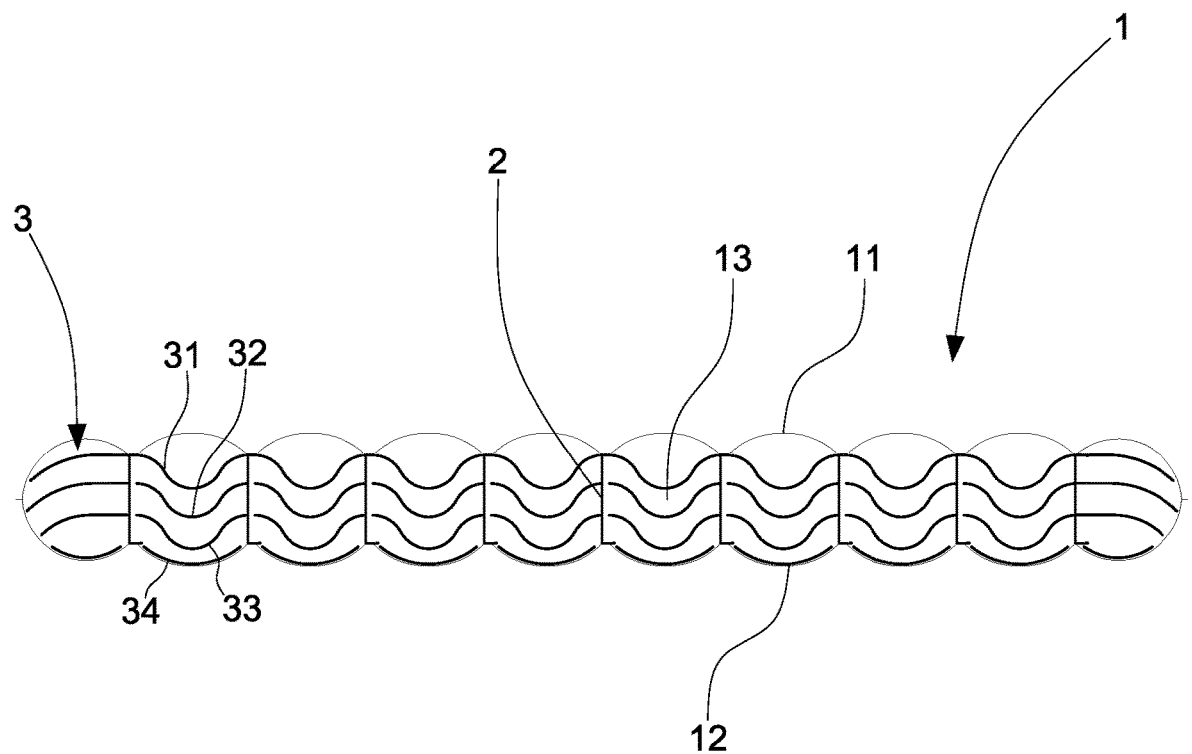
FIG. 4 is another partial cross-sectional view of the present invention, illustrating that portions of the blocking layers of the blocking unit are not positioned in height to be wavy.

Because the second connecting body 22 is designed to have the same width from top to bottom, after the blocking layers, namely, the first blocking layer 31, the second blocking layer 32, the third blocking layer 33 and the fourth blocking layer 34, are fitted on the second connecting bodies 22, their heights can be easily adjusted relative to the second connecting bodies 22. Because the blocking layers, namely, the first blocking layer 31, the second blocking layer 32, the third blocking layer 33 and the fourth blocking layer 34, have been respectively positioned in height by the first connecting bodies 21 next to the respective second connecting bodies 22, portions of the blocking layers, alternately fitted on the second connecting bodies 22, are not positioned in height to be wavy. As shown in FIG. 4, the mat 1 has the multiple blocking layers to form multiple layered spaces between the user's body and the ground to block temperature radiation. The blocking layers, namely, the first blocking layer 31, the second blocking layer 32, the third blocking layer 33 and the fourth blocking layer 34, are wavy to reduce air convection. Thus, the mat 1 is able to block air convection and temperature radiation.

What is claimed is:

1. An inflatable mat structure, comprising a mat, the mat including:
   an upper covering layer;
   a lower covering layer, peripheries of the upper covering layer and the lower covering layer being joined and closed;

at least one longitudinal connecting member, disposed between the upper covering layer and the lower covering layer, the longitudinal connecting member including a plurality of first connecting bodies and a plurality of second connecting bodies that are spaced and arranged alternately; the first connecting bodies each having different widths according to height and low positions; the second connecting bodies each having a same width from top to bottom, bottoms of the first connecting bodies and the second connecting bodies being connected;

a blocking unit, the blocking unit including a plurality of blocking layers, each blocking layer having openings that are different in size and correspond in height and in width to the first connecting bodies, each blocking layer further having openings corresponding in position to the second connecting bodies so that the plurality of blocking layers are spaced apart from each other to form a plurality of layered spaces that are not in communication with each other.

2. The inflatable mat structure as claimed in claim 1, wherein a space is defined between the upper covering layer and the lower covering layer.

3. The inflatable mat structure as claimed in claim 1, wherein the longitudinal connecting member is in the form of a light and thin sheet structure.

4. The inflatable mat structure as claimed in claim 1, wherein a plurality of upper joining portions is disposed on a top of the longitudinal connecting member, and the upper joining portions are joined to an inner edge of the upper covering layer.

5. The inflatable mat structure as claimed in claim 4, wherein a plurality of lower joining portions is disposed on a bottom of the longitudinal connecting member, and the lower joining portions are joined to an inner edge of the lower covering layer.

6. The inflatable mat structure as claimed in claim 1, wherein each blocking layer is fitted on the first connecting bodies and positioned by the corresponding widths of the first connecting bodies, respectively.

7. The inflatable mat structure as claimed in claim 6, wherein each blocking layer is fitted on the second connecting bodies through the openings corresponding in position to the second connecting bodies.

8. The inflatable mat structure as claimed in claim 1, wherein the blocking unit is made of a polyester film material.

9. The inflatable mat structure as claimed in claim 1, wherein the mat is a seat mat or a sleeping mat.

10. The inflatable mat structure as claimed in claim 1, wherein the mat is provided with a nozzle for the mat to be inflated or deflated.

* * * * *